Nov. 25, 1941.　　　　E. CARLSON　　　　2,264,196
PARING IMPLEMENT
Filed Aug. 19, 1939
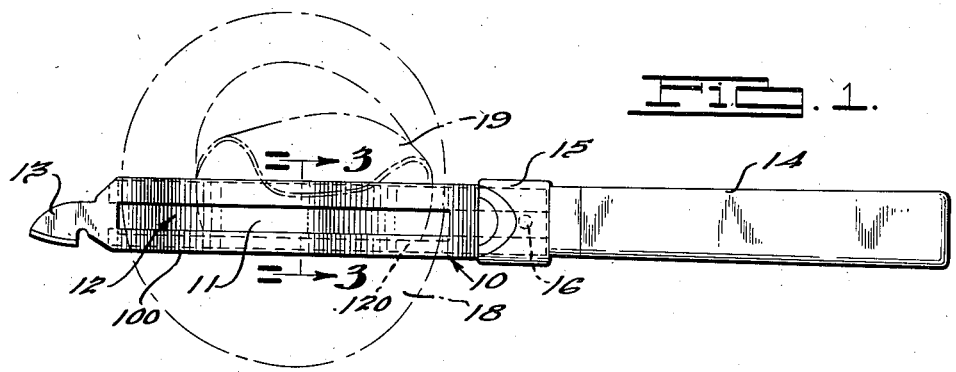
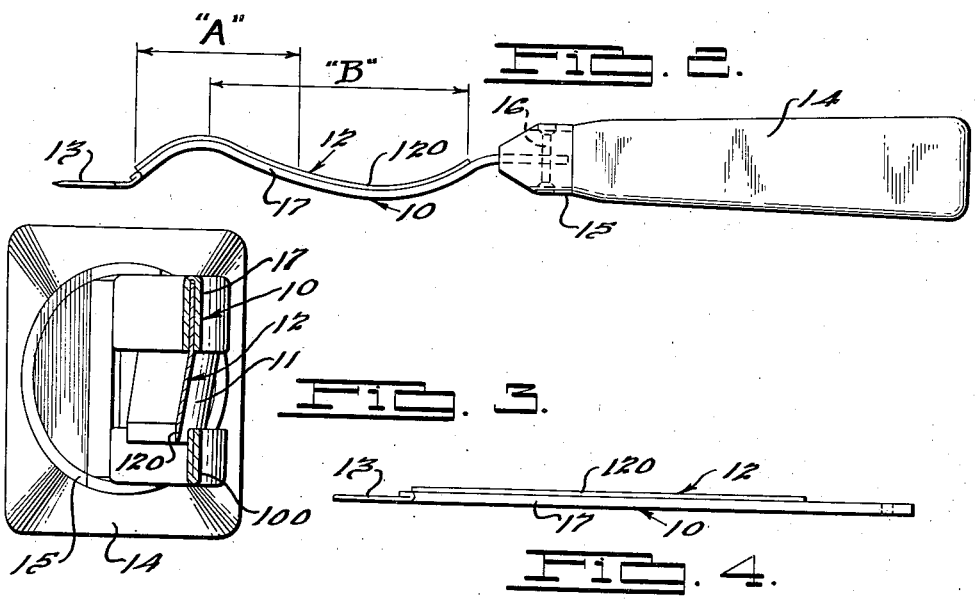
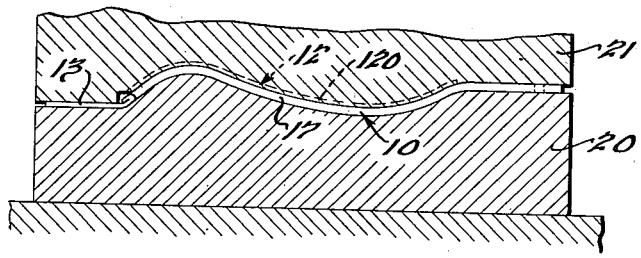
INVENTOR
BY　Emil Carlson.
Everett G. Wright
ATTORNEY Patented Nov. 25, 1941

2,264,196

UNITED STATES PATENT OFFICE 2,264,196

PARING IMPLEMENT

Emil Carlson, Detroit, Mich.

Application August 19, 1939, Serial No. 291,050

1 Claim. (Cl. 30—278)

This invention relates to improvements in implements for peeling and paring fruit, vegetables and the like.

One object of the invention is to provide an easily manipulated and readily cleaned gauged paring implement having a cutting blade particularly shaped to peel or pare both the concave and convex surfaces of fruits, vegetables and the like without material waste.

Another object of the invention is to provide an improved gauged implement for paring concaved and convex surfaces which is laid substantially flat against fruit, vegetables and the like during the paring thereof and which need not be held or tilted to any particular angle with respect thereto during cutting therewith whereby effective and efficient use is assured at all times.

Another object of the invention is to provide an improved gauged paring implement including a simple and economical method of manufacturing the same.

Other objects of the invention will become apparent by reference to the following detailed description taken in connection with the accompanying drawing, in which:

Fig. 1 is a side elevational view of a paring implement embodying the invention shown cutting to its gauged depth on the convex surface of a piece of fruit, a vegetable, a potato or the like.

Fig. 2 is a top plan view of the paring implement disclosed in Fig. 1 showing the preferred curvature of the gauged cutting blade.

Fig. 3 is a greatly enlarged cross sectional view of the improved paring implement taken on the line 3—3 of Fig. 1.

Fig. 4 is a top plan view showing the gauge blade and cutting blade in assembled relationship prior to forming and assembling into the handle.

Fig. 5 is a more or less diagrammatic view showing the assembled gauge blade and cutting blade formed between suitable dies into a reverse curve in a plane normal to the back thereof whereby the said cutting blade becomes simultaneously anchored in assembled relationship within the said gauge blade.

This invention is an improvement upon the invention disclosed and claimed in Patent No. 2,036,920 issued April 7, 1936, to E. Carlson, the applicant herein, pursuant to an application for patent filed October 27, 1934, Serial No. 750,342.

Referring now to the drawing wherein like numerals refer to like and corresponding parts throughout the several views, the particular embodiment of the invention disclosed therein comprises, in general, a gauge blade 10 having a rectangular slot 11 therethrough adapted to hold a cutting blade 12 as hereinafter described. A suitable cutting point 13 may be formed if desired on the outer end of the gauge blade 10 which serves to cut deep into fruit or vegetables or to cut the eyes out of potatoes independent of the paring function of the gauged cutting blade 12. The gauge blade 10 which carries the said cutting blade 12 is preferably securely mounted in the bifurcated end of a handle 14 which is strengthened by a ferrule 15. A rivet 16 disposed through the handle 14, the ferrule 15 and the gauge blade 10 securely fixed the said gauge blade 10 in the handle 14.

The gauge blade 10 is bent at its upper portion over and around the cutting blade 12 to provide a smooth back 17 for the paring implement as shown in Figs. 1 and 3. The said bent upper portion 17 of the gauge blade 10 also serves to hold the said cutting blade 12 frictionally in assembled relationship with respect to the said gauge blade 10. The lower portion of the said gauge blade 10 is preferably bent 180 degrees upon itself to provide a smooth gauge edge 100.

When assembled, the cutting edge 120 of the cutting blade 12 is suitably bent rearwardly with respect to the gauge edge 100 of the gauge blade 10 as indicated in Fig. 3, except however, the gauge blade 10 and the cutting blade 12, up to this point, have been manufactured straight as indicated in Fig. 4.

The straight assembled paring unit composed of a gauge blade 10 and a cutting blade 12 held in assembled relationship with respect to each other by the frictional grip between the bent over upper portion of the gauge blade 10 forming the back 17 thereof around the top of the cutting blade 10 is preferably inserted between suitable dies 20 and 21 as shown in Fig. 5 and formed to the desired curvature in a plane normal to the back of the gauge blade 10 which holds the said cutting blade 12. The reverse curvature of the assembled paring unit composed of a gauge blade 10 and a cutting blade 12 is preferably formed by the dies 20 and 21 to a reverse curvature substantially as shown in Figs. 2 and 5, however, any curvature to accomplish desired results may be employed.

In the preferred example shown in Fig. 2, the length "A" of the gauged blade is employed for paring concavely shaped articles while the length "B" of the gauged blade is employed for paring convexly shaped articles. In Fig. 1 the paring implement embodying the invention shown therein is depicted paring a convexly shaped potato 18, the peeling 19 being indicated as paying out through the opening between the cutting blade 12 and the gauge edge 100 of the gauge blade 10.

The instant invention provides a paring implement having a gauged blade which is not only shaped to conform to the convex or concave surfaces to be pared, but is so formed as to permit paring by "feel," that is, without having to hold the implement during use at any particular angle to the fruit, vegetables or the like to be pared. It is only necessary that the flat side of the paring implement be placed substantially flat on the concaved or convex surfaces of an item to be pared.

Also, the extreme simplicity of the construction of the implement and the inexpensive method of manufacturing the same permits the implement to be manufactured and sold much more cheaply than heretofore. Also, because of employing the particular method of manufacture disclosed herein, a great variety of blade curvatures may be had by simply changing the dies 20 and 21. Therefore, the expense of manufacturing several differently curved models is materially reduced over the prior art inasmuch as only one set of parts would be required.

Although but one embodiment of the invention has been shown and described and one method of manufacture has been disclosed, it is obvious that many changes may be made in the size, shape, arrangement and detail of the various parts of the novel paring implement and that the method of manufacturing the same may be altered without departing from the spirit of the invention as defined by the appended claim.

I claim:

In a paring implement, a gauge blade having a longitudinally disposed aperture therethrough, a cutting blade longitudinally coextensive of said aperture through said gauge blade, the said gauge blade being bent over at its upper edge to frictionally hold the said cutting blade longitudinally parallel thereto with the cutting edge of said cutting blade disposed below the said aperture through said gauge blade, the said gauge blade being bent over at its lower edge to present a smooth gauge edge, the said cutting blade being bent on its longitudinal axis whereby to dispose the cutting edge thereof in rearward spaced relationship with respect to the said gauge blade, and the assembled unit being formed to a suitable reverse curvature in a plane normal to the back of said gauge blade.

EMIL CARLSON.